Nov. 11, 1952 R. H. HERRICK 2,617,872

FREQUENCY SIGNALING SYSTEM

Filed April 2, 1949 2 SHEETS—SHEET 1

*INVENTOR.*
ROSWELL H. HERRICK

BY [signature]

ATTORNEY

INVENTOR.
ROSWELL H. HERRICK
BY
Chas. Tu. Candy
ATTORNEY

Patented Nov. 11, 1952

2,617,872

UNITED STATES PATENT OFFICE 2,617,872

FREQUENCY SIGNALING SYSTEM

Roswell H. Herrick, Lorain, Ohio, assignor to Automatic Electric Laboratories, Inc., Chicago, Ill., a corporation of Delaware Application April 2, 1949, Serial No. 85,139

4 Claims. (Cl. 177—353)

The present invention relates to signaling systems and more particularly to a selective calling system for calling one of a large number of receiving stations from a single transmitting station.

It is an object of this invention to provide a dependable signaling system of simple design whereby one of a group of receiving stations in communication with a transmitter may be alerted by means of a visual or audible signal.

Another object is to provide a receiver selective system especially adapted for use with mobile radio telephone systems.

A further object is to provide a signaling system in which one of a plurality of receivers responds to a particular sequence of transmitted frequency tone signals some of which may be single frequency tones and others of which may be tones of several frequencies.

Figure 3:
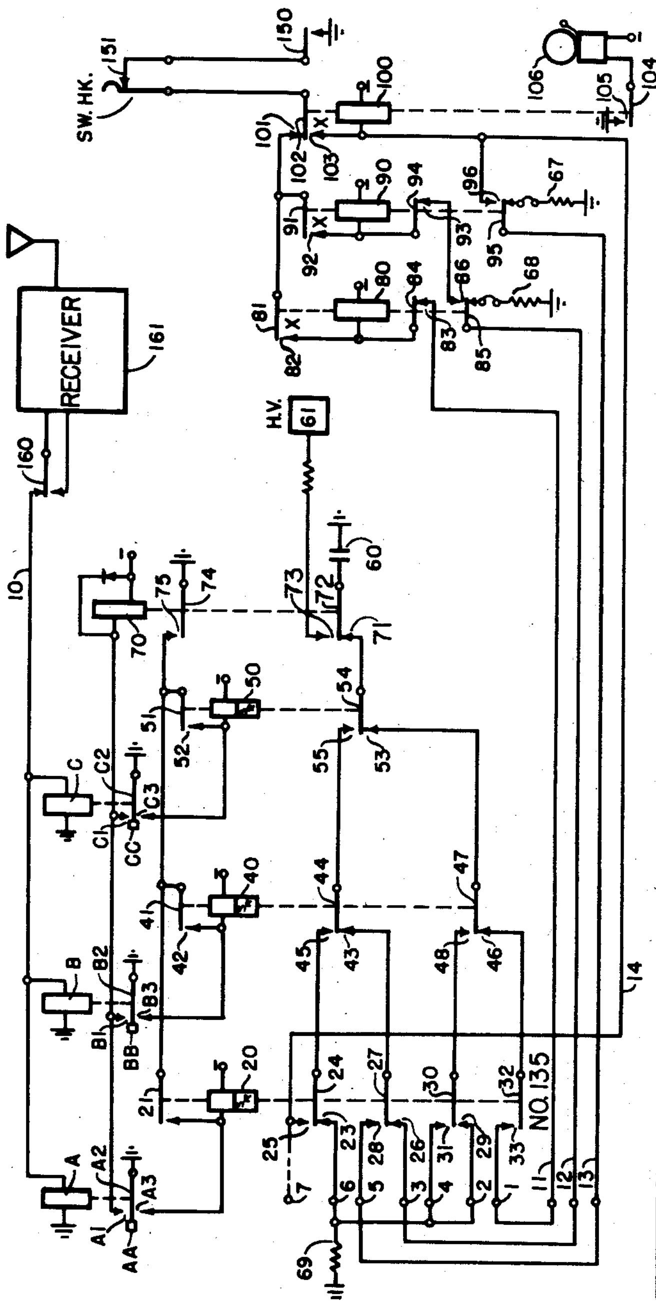
Fig. 3 illustrates in detail one of the typical receivers with a frequency responsive circuit in accordance with this invention.

Referring to Fig. 3 relays A, B and C are of the well-known "vibrator" or "tuned reed" type. Relay A is tuned to frequency "*a*," relay B is tuned to frequency "*b*," and relay C is tuned to frequency "*c*." The frequency range is not critical but a convenient operating range is from 100 to 600 cycles per second. Satisfactory spacing among frequencies may be obtained at frequency intervals of 40 cycles per second.

The tuned reeds AA, BB and CC associated respectively with relays A, B and C are capable of commencing vibration automatically when energized at the resonant frequency while remaining stationary at other frequencies. Thus, the relays A, B and C are all connected to the same circuit but their effect on the receiving control circuit is entirely dependent upon the frequency response of their associated tuned reeds.

The relays A, B and C at each station receiver are frequency-sensitive in response to signals transmitted over a line, such as 10, at their particular tuned frequency. The signals coming in over the line 10 may be sent directly by wire from a transmitter or they may be sent from a radio receiver 161 which is tuned to a sending station.

Associated with frequency-sensitive relays A, B, and C are respectively direct current relays 20, 40 and 50. The relays 20, 40, and 50 have a very slow release in order to insure discharge of a condenser 60 after it has been charged upon operation of a relay 70, which energizes upon the operation of any of relays A, B and C.

The discharge path taken from the condenser 60 to a particular one of a series of terminals 1, 2, 3, 4, 5, 6 and 7, depends upon the operation of the relays 20, 40 and 50 responsive to signals which excite the frequency-sensitive relays A, B, and C to operation.

By controlling the frequency of signals entering through the line 10, relays A, B, or C, individually, or any combination of relays A, B, and C, may be energized. Since there are seven combinations possible, e. g., A, B, C, A plus B, A plus C, B plus C, and A plus B plus C, there are seven possible paths for the discharge from the condenser 60 to follow. By assigning a digit to each of these paths a digit system utilizing only seven digits may be set up from three basic frequencies. An additional frequency-sensitive relay would allow for a digit system having 15 digits to be set up but would entail a more complicated and costly circuit. A digit system using only seven digits has been found to be both economical and practical and by constructing the apparatus to respond to various permutations of these seven digits the number of individual outlets may be $7n$ where $n$ is the number of calling digits. Thus, a three-number series gives 343 individual responses while a four-number series gives 2401 individual responses.

For the sake of convenience digit numbers have been assigned to the various operations of relays A, B, and C, as shown in the following Table I:

*Table I*

Relay A alone=digit 1
Relay B alone=digit 2
Relay C alone=digit 3
Relays A+B=digit 4
Relays A+C=digit 5
Relays B+C=digit 6
Relays A+B+C=digit 7

Where the selecting system is applied in a mobile telephone system to a fleet of police cars, each of which has a receiving set, such as shown in Fig. 3, but a different call number, it is important to have a general call and this may be conveniently provided by using the 7th channel for this purpose. In Fig. 3 the circuit is arranged for this general call in a manner to be further described hereinafter.

The use of channel seven for a general call decreases to six the channels available for individual call use, with the result that a three-number system allows for 216 individual calls and a four-number system for 1296.

Three of the terminals 1 to 7 in Fig. 3 are connected to the leads 11, 12 and 13 which extend to recording or signal control relays 80, 90, and 100. When actuated in sequence relays 80, 90 and 100 operate a signal such as a buzzer 106 to alert the operator. The circuit shown is for a three-number system but it is obvious that an additional lead and relay would create a 4-number system which would increase the number of individual calls possible by a factor of six.

The circuit of Fig. 3 is set for the call number 135 and would respond therefore to the operation in sequence of the relays A, C and A plus C in a manner to be described fully hereinafter. The other station receivers (not shown) similar to Fig. 3, would be set for different call numbers by different connections of conductors 11, 12, and 13 to terminals 1 to 7, inclusive.

The relays 20, 40, and 50 associated respectively with the frequency-sensitive relays A, B, and C have contacts interconnected in accordance with the frequency code shown in Table I so that when the relays operate on reception of the coded calling signals their contacts close a path for the discharge of a condenser 60 through the correspondingly numbered terminal to which the recording or signal-control relays 80, 90 and 100 are connected.

The terminals 1 to 6, inclusive, (or 1 to 7, inclusive, if the number "7" is used as a digit rather than as a "General Call"), shown to the left of the relay 20 contacts, are available so that the installer can "set up" the number 135 to which this particular receiving circuit responds.

Assuming now that the station shown in Fig. 3 is being called and remembering that the call number of this station is 135, then the frequency "*a*" is received for the first digit 1 to operate relay A, the frequency "*c*" is received for the second digit 3, and both frequencies "*a*" and "*c*" are simultaneously received for the digit 5. In response to the receipt of frequency "*a*" over conductor 10 from the transmitting station in accordance with the final digit 1 relay A alone responds to the frequency "*a*" to operate its tuned reed A2 to alternately close contacts A1 and A3. The closure of contacts A1 and A2 completes a circuit for energizing relay 70 from ground contacts A2, A1 and through the winding of relay 70 to battery. The rectifier shown bridged around relay 70 is provided to maintain a closed circuit for current flow through the winding of relay 70 during the open periods of the vibrating reed A2, due to the collapse of magnetic lines of force in relay 70, to prevent chattering of the relay contacts controlled by relay 70. Relay A also completes a circuit for operating slow-to-release relay 20 from ground at contacts A2 and A3. Operation of relay 70 at contacts 72 and 73 completes a circuit for charging condenser 60 from the high voltage source 61 and at contacts 74—75 prepares locking circuits for relays 20, 40 and 50. Relay 20, upon operating, at contacts 21 completes its own locking circuit to contacts 75—74 and at contacts 32 prepares the circuit for operating the first recording relay 80.

When the tone frequency for the first transmitted digit ceases, tuned relay A at contacts A1 opens the circuit to relay 70 and at contacts A3 opens the circuit to relay 20 now locked over contacts of relay 70. After a short interval relay 70 restores and at contacts 72—71 completes a discharge circuit for condenser 60 and for operating relay 80 before slow-to-release relay 20 restores. This circuit may be traced as follows: from ground through charged condenser 60, contacts 72—71, 54—53, 47—46, 32—33, terminal 1, conductor 11, contacts 83—84, and through the winding of relay 80 to battery. The discharge of condenser 60 causes relay 80 to close its X contacts 82—81 to complete a locking circuit for itself at closed contacts 150 before opening its energizing circuit at contacts 83—84. Relay 80 at contacts 85—86 prepares a circuit for the second digit recording relay 90. Slow-to-release relay 20 releases a predetermined time interval after the release of relay 70 opened the locking circuit of relay 20 and at contacts 32—33 opens another point in the discharge circuit of condenser 60 and the initial energizing circuit of relay 80.

When transmission of the second digit tuned frequency "*c*" is received on conductor 10, tuned relay C is operated to close contacts C1, C2 and C3. At contacts C1—C2 relay C completes the circuit for operating relay 70 and at contacts C2—C3 completes the circuit for operating relay 50. Relay 70 operates contacts 74—75 to prepare the locking circuit for relay 50 and at contacts 72—73 charges condenser 60 over the high voltage source 61. Relay 50 locks itself at contacts 52—51 to contacts 75—74 and at contacts 54—55 prepares a circuit for relay 90 and the discharge circuit for condenser 60.

When the tone frequency "*c*" for the second transmitted digit (digit 3 in this instance) ceases, relay C restores and opens the energizing circuit of relays 70 and 50. Relay 70 restores but relay 50 is locked energized until relay 70 restores. The restoration of relay 70 at contacts 74—75 opens the locking circuit to slow-to-release relay 50 but this relay, due to its slow-to-release characteristics, maintains an armature attracted for a predetermined interval. During this interval a circuit is closed for discharging condenser 60 through the winding of the second digit recording relay 90 as follows: from ground, condenser 60, contacts 72—71, now closed by the restoration of relay 70, contacts 54—55, 44—43, 27—26, terminal 3, conductor 12, closed contacts 85—86, 93—94 and through the winding of relay 90 to battery. Relay 90 is energized by the condenser discharge to close contacts 92 to thereby complete a locking circuit for relay 90 to grounded contacts 150. Relay 90 fully operates over its locking circuit to open its initial energizing circuit at contacts 93—94 and at contacts 95—96 prepares a circuit for the third digit recording relay 100. Slow-to-release relay 50 restores after an interval to open another point in the condenser discharge circuit and the initial energizing circuit of relay 90.

When transmission of the third digit (5) tuned frequencies "*a*" and "*c*" is received over conductor 10, both tuned relays A and C are operated to close contacts A1, A2 and A3 and C1, C2 and C3. At contacts A1—A2 and C1—C2 the circuit for operating relay 70 is completed. At contacts A2—A3 the circuit for operating relay 20 is completed and at contacts C2—C3 the circuit for operating relay 50 is completed. Both relays 20 and 50 complete their locking circuits as previously described to operated contacts 74—75 of relay 70. Relay 70 at contacts 72—73 again charges condenser 60. The operation of both relays A and C now prepares a circuit for discharging condenser and for operating the third digit recording relay 100 when relay 70 restores.

When the tone frequencies "a" and "c" for the third digit (5) are removed from conductor 10 both relays A and C restore, and causes the release of relay 70 as previously described. Before slow releasing relays 20 and 50 restore the following circuit is completed by the release of relay 70: from ground through charged condenser 60, contacts 72—71, 54—55, 44—43, 27—28, terminal 5, conductor 13, contacts 95—96, and the winding of relay 100 to battery. Condenser 60 discharges over this circuit to operate relay 100 which closes its X contacts 103—102 to fully operate such relay and to complete a locking circuit for itself to grounded contact 150. At contacts 104—105 relay 100 completes a circuit for operating buzzer 106 to signal to called party. Relay 100 at contacts 101—102 opens the holding circuit of relays 80 and 90 to cause relays 80 and 90 to restore and thus save battery current.

The called party in response to hearing his buzzer will answer the call and in so doing will cause ground connection at contacts 150 to be removed thereby causing the deenergization of relay 100 which restores to open the buzzer circuit. The removal of ground from contacts 150 may be accomplished by operation of the switchhook springs on the telephone set or by the operation of another relay in any well-known manner. Contacts 160 are also operated in any well-known manner when the called party answers to disconnect conductor 10 from the radio receiver 161 and to close a circuit to the handset receiver (not shown) of the called party. The contacts 160 remain operated until the called party hangs up so that other calls to other stations will not interfere with the instant call. The tuned frequency relays A, B and C are therefore disconnected from the receiver and cannot respond to frequency transmission on other calls.

When the called party hangs up contacts 160 are restored to normal so that this same station can be called on another call.

In all the other receiving stations it will be remembered that the conductors 11, 12 and 13 are cross-connected to the terminals, such as terminals 1 to 7, inclusive, in different manners in accordance with the individual call numbers of each individual station, and therefore while one or two of the digit-sending relays, such as 80 or 90 may be operated, in the case where the first two digits are similar, only one of the stations corresponding to all three digits received will have its third digit-sending relay 100 operated, so as to signal the proper subscriber. In the non-called stations one or more of the recording relays, such as 80 or 90, may be temporarily operated and locked, but as soon as the call is terminated the carrier is removed with the result that the well-known squelch relay (not shown), restores and disconnects ground from contacts 150 to accomplish the release of the locked recording relays at the non-called stations.

Figure 3B:
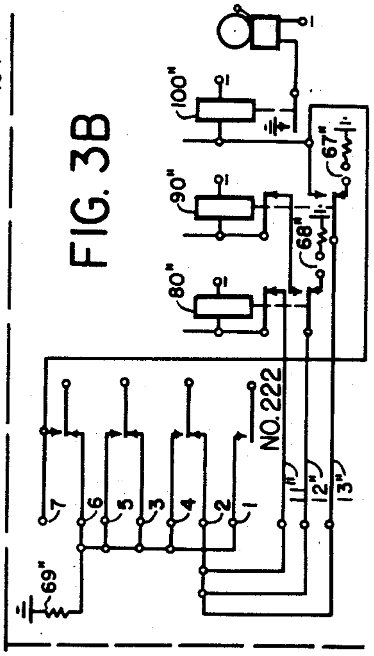
Figs. 3A and 3B diagrammatically show in part two other receivers, similar to the receiver shown in Fig. 4 having, however, different assigned call numbers.
Figure 3A:
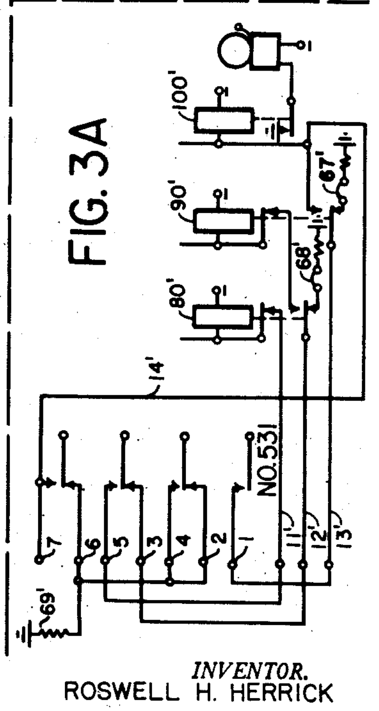

It may be seen that relays 80, 90 and 100 must operate in succession if the alerting signal is to be actuated. If it were desired to change the number from 135 to 531 it would only be necessary to connect terminal 5 to conductor 11 and terminal 1 to conductor 13, as shown in Fig. 3A. It would not be necessary to alter the connection of terminal 3. The same digit may be used more than once in a single calling sequence. For example, to call number 222, terminal 2 would be connected to all three of the conductors 11, 12, and 13, as shown in Fig. 3B.

Occasionally, the slow release feature of relays 20, 40 and 50 will cease to function properly and these relays will not release at the same instant. When this happens a plural tone marking is apt to become a single tone marking for an instant of time and this will give a false ring on another receiver. For instance, if relays 20 and 50 operate to create a circuit to terminal 5, relay 50 might release first and relay 20 might then create a path to terminal 1 to give a false alerting signal. This possibility may be obviated for the most part by providing a ground connection 69 for numbers of a particular sequence which are not used. Thus, for the number 135 the terminals 2, 4, and 6 would be grounded at 69. This receiver would then not be alerted by a call to receiver 435 since the charge from condenser 60 would be grounded at 69 as soon as relays 20 and 40 were actuated and if relay 40 then released too soon there would be no charge on the condenser 60 which would energize relay 80 by way of terminal 1.

The terminals corresponding to any of the digits used in a calling number must not be grounded at 69. However, some protection against false ringing is afforded by jumper-grounds 67 and 68 which operate in conjunction with relays 90 and 80, respectively. In the case of the illustrated receiver of number 135 terminal 5 is grounded at 67. Consequently, if the number 5 is called as either or both of the first two digits the charge of condenser 60 will be grounded at 67 in the case of receiver 135 and a false signal cannot occur. In order to remove the ground 67 from the terminal 5 it is necessary that relays 80 and 90 be operated in sequence, a condition which can occur for this particular receiver only where condenser 60 has previously been discharged through terminals 1 and 3.

In the embodiment illustrated it is only the compound frequencies which make up the digits 4, 5, and 6 which may give false signals and consequently it is not important to provide ground for terminals 1, 2, and 3.

There are some numbers which are likely to give a false ring if the relays 20, 40 and 50 are not releasing at the same time. For example, the number 515 might give a false signal at receivers 511 or 513 since neither terminal 5 nor terminal 1 could be grounded at ground 69 and the first two digits received would operate relays 80 and 90 to remove jumper-grounds 67 and 68. If relay 20 released too quickly on the third digit a false alarm would be given at receiver 513 and if relay 50 released too quickly a false alarm would be given at receiver 511.

A call to receiver 553 might give a false signal at receiver 533 provided relay 20 were releasing before relay 50. Under these conditions the calling of receiver 553 would affect receiver 533 as follows: The first digit would actuate relay 80, removing ground 68. At the second digit no discharge would take place while relays 20 and 50 were operated since terminal 5 would be without ground. Upon release of relay 20 a path would be opened for the discharge of condenser 60 through terminal 3. This would actuate relay 90 which would provide a path to relay 100 responsive to the third digit path through terminal 3.

In order to insure a trouble-free system, numbers which would give a false signal at a different receiver are best omitted. The omitted numbers fall into the following two groups:

1. The last digit is more than 3 and is used previously in the sequence. Examples, 355, 535.

2. The last digit is less than 4, the first two digits are the same and greater than 3, and the frequency producing the path to the last digit is a component of the frequencies producing the path to the first two digits. Examples, 553, 662.

While omission of the numbers which might give false signals decreases the number of receivers available, a great many trouble-free numbers remain and the loss does not represent a serious limitation upon the system.

Terminal 7 is connected directly to relay 100 by means of a conductor 14. By making this connection common to all receivers a general call may be sounded by sending all three frequencies at once. It is obvious that the conductor 14 could be omitted in which case terminal 7 would be available for use in individual call selection.

After a particular receiver has been alerted the act of picking up the handset operates a cradle switch 160 which by-passes the frequency code circuit preparatory to the beginning of the conversation. The switch 160 may also be contacts on a system relay, such as a squelch relay (not shown).

Operation of the switch 150 may likewise be controlled by a system relay which closes the switch 150 on appearance of the carrier wave and opens it again when the carrier goes off. A switchhook 151 opens the circuit of relay 100 when the call is answered and thereby eliminates ground from relay 100, which is thereupon deenergized. This cuts out the buzzer 106 during the subsequent conversation.

Figures 1, 2:
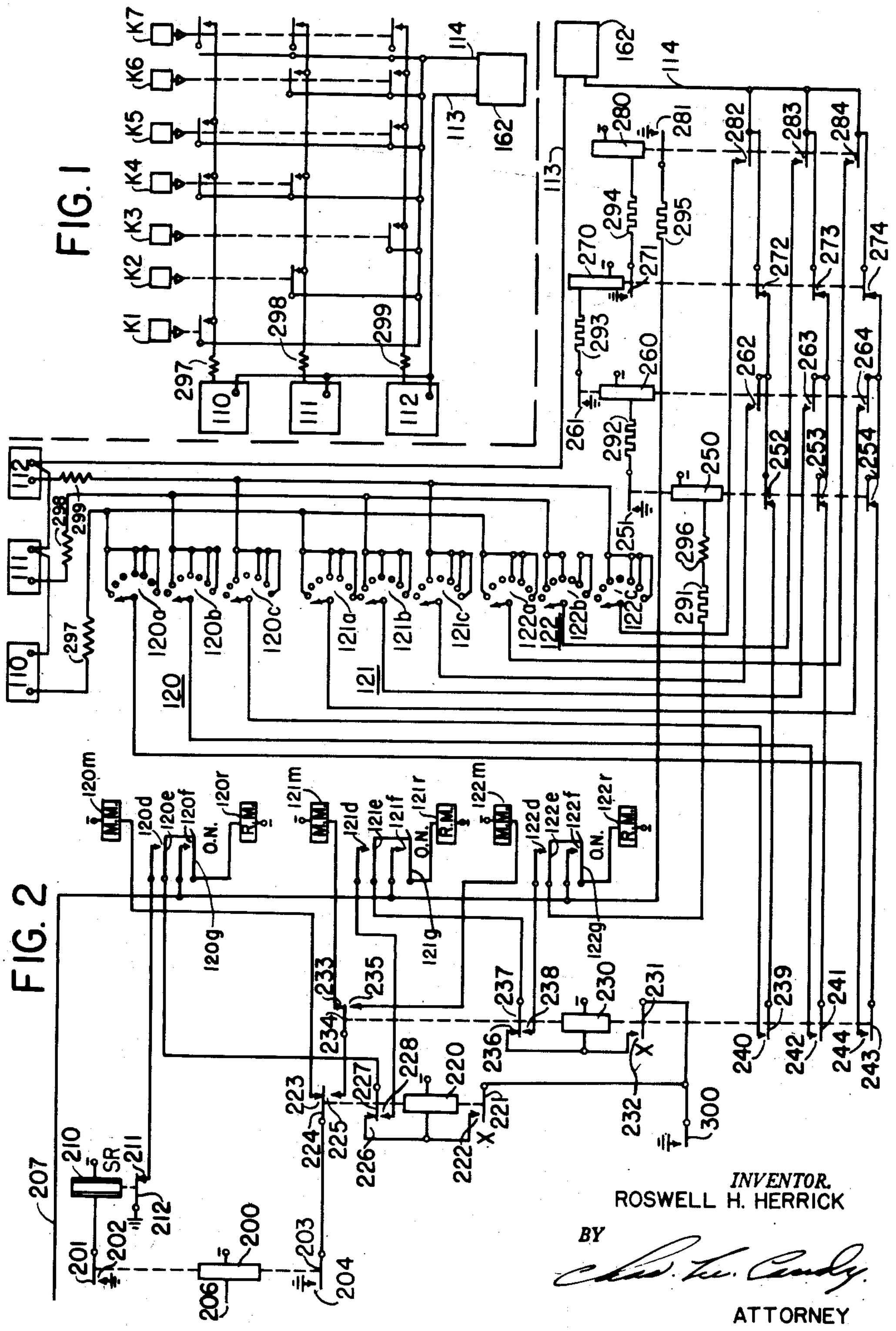
Fig. 1 illustrates a key-operated transmitting circuit.
Fig. 2 illustrates a transmitting circuit in which the frequency tone signals are transmitted by dialing.

In the key-operated transmitting circuit of Fig. 1, three oscillators 110, 111, and 112 are set to operate at frequency "a," "b," and "c," respectively. A series of seven keys K1 to K7 are arranged in the circuit of the oscillators 110, 111, and 112 in the obvious manner shown so that closing the keys places the oscillators in the transmitting circuit in accordance with the following Table II.

*Table II*

| Key No. | Frequency |
|---|---|
| K1 | $a$ |
| K2 | $b$ |
| K3 | $c$ |
| K4 | $a+b$ |
| K5 | $a+c$ |
| K6 | $b+c$ |
| K7 | $a+b+c$ |

The oscillators which may be of the well-known thermionic tube type, are connected to the modulation circuit of a transmitter 162 by means of conductors 113 and 114. The transmitter 162 may be of any well-known type.

While the principal use of the invention disclosed herein will be with a wireless transmitter-receiver system it is not so limited and is equally adapted to signals transmitted by means of wires.

In order to call the number 135 by means of the key operated transmitter of Fig. 1, K1 is pressed for about five seconds and then released; this is followed after an interval by a similar operation with K3; and finally K5 is pressed for about five seconds.

The dial calling apparatus of Fig. 2 requires a more complex arrangement than is required for the embodiment of Fig. 1. The oscillators 110, 111 and 112 are used as in Fig. 1. Each oscillator is connected to different bank each of three 3-bank minor switches, the oscillator 110 being in the circuit of banks 120*a*, 121*a*, and 122*a*; the oscillator 111 being in the circuit of banks 120*b*, 121*b*, and 122*b*; and the oscillator 112 being in the circuit of banks 120*c*, 121*c*, and 122*c*. The "*a*" banks are for the first digit of the called number, the "*b*" banks for the second, and the "*c*" banks for the third.

The three minor switches 120, 121 and 122 are of the usual type which are stepped upon receipt of an impulse and released by a release magnet. Each switch has three banks of seven contacts each. The minor switches serve to store the numbers as they are dialed, a requirement made necessary by the fact that the dialing is more rapid than the transmission.

A pulsing relay 200 operates in response to the operation of a dial (not shown), the pulsing relay being operated once for each impulse transmitted. Upon operation, the relay 200 furnishes ground to operate a slow-release relay 210, which holds operated over the pulses constituting the digit. A switch 300 furnishes ground to maintain relays 220 and 230 operated after their initial energization. The switch 300 may be controlled by a squelch relay (not shown) or by a hook switch (not shown) whereby the switch is opened upon termination of the call and relays 220 and 230 are restored to make them available for the next call.

It will now be assumed that the calling party wishes to call the party of the station receiver shown in Fig. 3. The calling party accordingly operates the dial (not shown) in accordance with the digits 1, 3 and 5 which corresponds to the call number of the desired called party.

In response to dialing the first digit 1 relay 200 is energized once over conductor 206 for the single impulse comprising the first digit 1. At contacts 201 relay 200 completes an obvious circuit for operating the slow-to-release relay 210 and at contacts 204 completes a circuit for operating the motor magnet 120M of the minor switch 120 as follows: ground contacts 204, 224—223 and winding of motor magnet 120M to battery. Motor magnet 120M operates its stepping pawl (not shown), to engage and step the ratchet wheel (not shown), to advance the wipers 120*a*, 120*b* and 120*c* from their normal positions into engagement with their respective first bank contacts to select frequency A generated by oscillator 110. Off-normal springs O. N. comprising springs 120*d*, 120*e*, 120*f* and 120*g*, operate as soon as the wipers of switch 120 step from their normal positions and remain operated until the switch is fully restored by energization of the release magnet 120*r*. The wipers of the switch are held in their operated positions by a holding detent or release pawl which is controlled by the release magnet. When the release magnet operates the release pawl from engagement with the stepping ratchet wheel a spring in the switch returns the wipers to their normal position.

The closure of off-normal springs 120*d* and 120*e* prepares a circuit for transfer relay 220 and off-normal springs 120*f* and 120*g* prepare a circuit for operating release magnet 120*r*.

After termination of the first digit transmission relay 206 restores and at contacts 204 opens the circuit to motor magnet 120m which releases its stepping pawl preparatory for advancing the wipers another step. At contacts 201 relay 200 opens the circuit to slow-to-release relay 210 which after a predetermined time interval restores its armature to reclose contacts 211—212. It should be stated that relay 210, due to its copper sleeve around the core of the magnet renders the relay slow to release. The release period of relay 210 being such that the relay will restore between the transmission of successive digits but will be maintained in energized position during successive pulses of any digit. The release of relay 210 after transmission of the first digit completes a circuit for operating relay 220 as follows: ground contacts 212—211, off-normal contacts 120d—120e, contacts 227—226 and through the winding of transfer relay 220 to battery.

Relay 220, upon operating, closes its X contacts 221—222 before operating its remaining contacts to complete a circuit from grounded contact 300 to fully operate and lock itself. At contacts 223—224 relay 220 opens the pulsing circuit to motor magnet 120m and at contacts 225 transfers the pulsing circuit to motor magnet 121m of the second minor switch 121. At contacts 226 relay 220 opens the original energizing circuit to relay 220 now locked over contacts 221 and 300 and at contacts 228 prepares a point in the circuit for operating the second transfer relay 230.

In response to the dialing of the second digit 3, three impulses are transmitted over conductor 206 to cause three energizations and deenergizations of pulsing relay 200. Relay 200 at contacts 201 again operates relay 210 which operates to remove ground at contacts 212 from the transfer circuit. As previously described, relay 210 due to its slow release characteristics remains operated during impulse transmission of the second digit and releases only after pulsing relay 200 has been restored for a predetermined time after receipt of the last impulse of the second digit.

At contacts 204 relay 200 completes a circuit for operating motor magnet 121m of the second minor switch 121 as follows: from ground, contacts 204—203, 224—225, 234—233, and through the winding of the motor magnet 121m to battery. Motor magnet 121m operates its stepping pawl to engage and rotate the ratchet wheel one step to advance the wipers of switch 121 into engagement with their first bank contacts. Off-normal springs 121d, 121e, 121f and 121g operate in response to the wipers being moved from their normal positions to prepare circuits for relay 230 and release magnet 121r.

After the first pulse of the second digit relay 200 restores and opens the circuit to motor magnet 121m causing the stepping pawl to be positioned opposite the next tooth of the ratchet wheel preparatory to stepping the wipers in their second step. In response to the second impulse of the second digit relay 200 reenergizes to reclose the circuit to motor magnet 121m to cause the wipers to be stepped to their second bank contacts in the same manner as previously described. Relay 200 restores after termination of the second pulse of the second digit and is reenergized in response to the third impulse of the second digit to step the wipers into engagement with their third bank contacts to select frequency "c" generated by oscillator 112. A predetermined time after relay 200 restores after the transmission of the third pulse of the second digit, slow-to-release 210 relay restores and at contacts 212 completes a circuit for energizing transfer relay 230 as follows: ground, contacts 212—211, 120d—120e, 227—228, 121d—121e, 237—236, and through the winding of relay 230 to battery.

Relay 230 closes its X contacts 231—232 to complete a circuit for fully operating and locking itself in operated position over grounded contacts 300 before operating its remaining contacts. Relay 230, upon fully operating, at contacts 233 opens the pulsing circuit to motor magnet 121m and at contacts 235 prepares a pulsing circuit for motor magnet 122m of minor switch 122. At contacts 240, 242 and 244, relay 230 connects the wipers 120a, 120b and 120c to the output conductor 114 extending to the modulation circuit for the transmitter 162 for transmitting the tuned frequency or combination of frequencies as determined by the setting of the first digit minor switch 120. In the instant case, since minor switch 120 was operated only one step in accordance with the first digit 1, the wipers 120a, 120b and 120c are in engagement with their first bank contacts with the result that only the oscillator 110 for generating tone frequency A is bridged across the output conductors 113 and 114 extending to the transmitter. This circuit may be traced from the transmitter over conductor 113, oscillator 110, resistance 297, first bank contact and wiper 120a, contacts 243—244, 254, 274, and conductor 114 to the transmitter. Wipers 120b and 120c being in engagement with dead bank contacts do not connect any of the oscillators to the output conductors 113 and 114 with the result that only the tuned frequency A is transmitted to the transmitter for modulation and transmission to the various receivers, such as shown in Fig. 3. In response to the dialed digit 1 the minor switch 120 has therefore been set to its first position to cause the transmission of the single tuned frequency A after receipt of the second dialed digit.

In response to the dialing of the third digit 5, five impulses are transmitted over conductor 206 to cause five energizations and deenergizations of relay 200. Relay 200 again operates relay 210 and transmits five impulses to the motor magnet 122m of the third digit minor switch 122. This pulse circuit may be traced as follows: ground contacts 204, 224—225, 234—235, and through the winding of motor magnet 122m to battery. In the same manner as previously described the five pulses transmitted over the above-traced circuit cause the wipers 122a, 122b and 122c of switch 122 to be set in engagement with their fifth bank contacts to select the frequencies A and C generated by oscillators 110 and 112. The off-normal springs of switch 122 close as soon as the wipers are stepped off normal to prepare circuits for relay 250 and the release magnet 122r.

When relay 210 restores after the third digit a circuit is completed for energizing relay 250 as follows: ground, contacts 212—211, 120d—120e, 227—228, 121d—121e, 237—238, 122d—122e, temperature sensitive resistor 291, resistance 296 and winding of relay 250 to battery. Due to the presence of the temperature-sensitive resistor 291 insufficient current flows in the circuit for relay 250 to operate at the time this circuit is first closed. However, as is well known, the resistor 291 gradually reduces its resistance to current flow and a predetermined time interval after the closure of this circuit the resistance is reduced sufficiently to permit enough current flow to cause relay 250 to operate. The time delay in this instance is approximately two seconds and therefore relay 250 operates in about two seconds after its circuit is closed. Resistors 292, 293, 294 and 295 are also temperature-sensitive resistors of the same type as resistor 291 for respectively controlling the operations of relays 260, 270, 280 and the release magnets of the minor switches.

When relay 250 finally operates after a two-second delay, said relay at contacts 251 completes an operating circuit for relay 260 through the temperature-sensitive resistor 292, and at contacts 252, 253, and 254 opens the circuit connecting wipers 120*a*, 120*b* and 120*c* to the output conductor 114 thereby disconnecting frequency A, generated by oscillator 110, from the output conductor 114 to stop transmission for an interval of time. This interval of time is determined by the temperature-sensitive resistor 292 included in the circuit of relay 260.

Approximately two seconds after the closure of the circuit to relay 260, relay 260 operates. At contacts 261 relay 260 closes a circuit through the temperature-sensitive resistor 293 for relay 270 and at contacts 262 connects the oscillator 112 for generating frequency C to the output conductor 114. The closure of contacts 263 and 264 at this time is without effect because wipers 121*a* and 121*b* are in engagement with dead contacts and are not connected to any of the oscillators. The circuit for transmitting frequency C to the transmitter 162 may be traced from the transmitter over conductor 113, oscillator 112, resistance 299, third bank contact engaged by wiper 121*c* and said wiper, contacts 262, 272, conductor 114 to the transmitter which now transmits this frequency C over the air or wires to receiving sets such as shown in Fig. 3. Frequency C is maintained on the air, or transmitted over wires, for a period of time dependent upon temperature-sensitive resistor 293 and the operate time of relay 270. Since it takes about two seconds before resistor 293 changes its resistance to permit the operation of relay 270, frequency C is transmitted for a period of about two seconds after which it is cut off by the operation of relay 270.

Approximately two seconds after the closure of its circuit relay 270 operates and at contacts 272 disconnects oscillator 112 from the output conductor 114 to stop transmission of frequency C. At contacts 271 relay 270 closes a time delay circuit for operating relay 280 including the temperature-sensitive resistor 294. Since it takes relay 280 about two seconds to operate over this circuit due to the resistor 294 the transmission is stopped for a similar period of time.

After approximately two seconds delay relay 280 operates and at contacts 282 and 284 simultaneously connects frequencies "*a*" and "*c*" to the output conductor 114. Contacts 283 have no effect at this time because wiper 122*b* is engaging a dead bank contact. At contacts 281 relay 280 completes a delay circuit for operating the release magnets 120*r*, 121*r* and 122*r* after a predetermined time due to the inclusion of the temperature-sensitive resistance 295 in their circuits. The circuits for simultaneously connecting frequencies "*a*" and "*c*" to the output circuit to the transmitter may be traced as follows: from the transmitter conductor 113, oscillator 112, resistor 299, fifth bank contact and wiper 122*c*, contacts 282 to conductor 114 and in parallel therewith conductor 113, oscillator 110, resistance 297, fifth bank contact and wiper 122*a*, contacts 284 and conductor 114. Transmission of frequencies "*a*" and "*c*" continues until the minor switches release to cause the sequential release of relays 250, 260, 270 and 280. The circuit for operating release magnets 120*r*, 121*r* and 122*r* may be traced from ground at contacts 281, temperature-sensitive resistor 295, and through off-normal contacts 122*f*—122*g*, 121*f*—121*g*, and 120*f*—120*g* in parallel to the windings of release magnets 122*r*, 121*r* and 120*r* to battery. Approximately two seconds after the completion of these release circuits the resistor 295 changes its resistance value sufficiently to cause the operation of release magnets 120*r*, 121*r* and 122*r*. The operation of these release magnets causes their wipers to restore to normal and when the respective switch wipers are restored the circuit for relay 250 is opened at contacts 120*d*—120*e*, 121*d*—121*e*, or 122*d*—122*e*. Relay 250 at contacts 251 opens the circuit to relay 260 which restores. At contacts 261 relay 260 opens the circuit to relay 270 which restores. At contacts 271 relay 270 opens the circuit to relay 280 which restores. At contacts 281 relay 280 opens the circuit to release magnets of the minor switches. The circuits of the release magnets were also opened by the opening of their respective off-normal contacts, such as contacts 120*f*—120*g*, 121*f*—121*g* and 122*f*—122*g*, when their associated wipers returned to normal position. The release of relay 280 at contacts 282 and 284 as well as the release of the switch wipers removed the frequencies "*a*" and "*c*" from the transmitter to stop further transmission.

From the foregoing description it will be seen that in response to dialing the call number comprising digit 1, 3 and 5, frequency "*a*" alone, followed by a pause, frequency "*c*" alone, followed by a pause, and then both frequencies "*a*" and "*c*" were successively transmitted to transmit the code call number of the substation receiver shown in Fig. 3 to cause the subscriber thereat to be selectively signaled.

Contacts 300 automatically open after the calling party terminates the connection to the called party in any well-known manner; for example, when the calling party replaces his handset in the cradle one or more relays (not shown) operate to remove ground from contacts 300. The removal of ground from contacts 300 opens the locking circuits of relays 220 and 230 thereby causing such relays to restore to normal. The relays and apparatus are now all restored to normal and may be used on subsequent calls.

Conductor 207 is provided to release the minor switches in case the call is abandoned after dialling one or more digits. Shortly after the call is abandoned conductor 207 is grounded to energize the release magnets of the operated minor switches to restore them to normal over circuits including their closed off-normal contacts, such as contacts 120*f*—120*g*.

Other receivers, such as diagrammatically shown in Figs. 3A and 3B, similar to the receiving station shown in Fig. 3, having, however, different call numbers individually assigned thereto may be called by means of the call transmitting system shown in Fig. 2. Code transmission for the first dialed digit is determined by the wiring of the banks accessible to wipers 120*a*, 120*b* and 120*c*, code transmission for the second dialed digit is determined by the wiring of the banks accessible to wipers 121*a*, 121*b* and 121*c*, and code transmission for the third dialed digit is determined by the wiring of the banks accessible to wipers 122*a*, 122*b* and 122*c*. Any combination of call numbers comprising three digits, any digit of which may include any one of the numbers 1 to 7, inclusive, may be dialed and coded digits each comprising a single tone frequency or a combination of tone frequencies is transmitted responsive thereto in a manner obvious from the foregoing description.

What is claimed is:

1. In a selective signaling system, a plurality of relays tuned to different frequencies, means for receiving a signal comprised of a plurality of different successively applied frequency combinations, said relays being actuated whenever said signal comprises their respective frequency combinations, a condenser charged by operation of said relays, an operating circuit including recording relays for discharging said condenser and for operating said recording relays, signaling means operated responsive to said recording relays, and a general call circuit operative responsive to the simultaneous operation of all of said tuned relays for also operating said signaling means.

2. In a selective signaling system, a first, second, and third relay each tuned to a different frequency, means for receiving a signal comprising successive single or composite combinations of said frequencies, said relays being actuated whenever said signal includes their respective frequencies, a fourth, fifth, and sixth relay operated respectively by said first, second, and third relays, said fourth, fifth, and sixth relays having interconnected contacts to provide seven paths therethrough, a condenser, a seventh relay controlling a charging circuit to said condenser disposed to discharge through the contact circuit of said fourth, fifth, and sixth relays, circuits controlled by said first, second or third relays for controlling said seventh relay, an eighth, ninth, and tenth relay connected to said contact circuit and disposed to operate a signal responsive to a predetermined sequence closure of three of the seven paths controlled by said fourth, fifth, and sixth relays, and a general call circuit operative responsive to the simultaneous operation of said fourth, fifth and sixth relays for also operating said signal.

3. In a selective signalling system, a plurality of frequency sensitive relays each tuned to a different frequency, means for transmitting frequency signals through said frequency sensitive relays, a slow release relay associated with each frequency sensitive relay, circuits through contacts of each frequency sensitive relay for energizing its associated slow release relay when said frequency sensitive relay is energized, a condenser, means for charging said condenser, a plurality of selective discharge circuits for said condenser through contacts of said slow release relays, means for operating an alarm signal in response to a particular sequence of condenser discharge paths set up by operation of said slow release relays, and a general call circuit operative responsive to the simultaneous operation of all of said frequency sensitive relays for also operating said alarm signal.

4. In a selective signalling system, three frequency sensitive relays each tuned to a different frequency, means for transmitting frequency signals through said relays, a slow release relay associated with each of said frequency sensitive relays energized by closure of the contacts of the associated frequency sensitive relays, a condenser, means for charging said condenser, a plurality of discharge paths for said condenser through contacts of said slow release relays, means for operating an alarm signal in response to a particular sequence of condenser discharge paths set up by operation of said slow release relays, and a general call circuit operative responsive to the simultaneous operation of said three frequency sensitive relays for also operating said alarm signal.

ROSWELL H. HERRICK.

REFERENCES CITED

The following references are of record in the file of this patent:

UNITED STATES PATENTS

| Number | Name | Date |
|---|---|---|
| 1,786,805 | Wensley | Dec. 30, 1930 |
| 1,904,929 | Richardson | Apr. 18, 1933 |
| 2,198,901 | Boswau | Apr. 30, 1940 |
| 2,255,162 | Hart | Sept. 9, 1941 |
| 2,325,829 | Boswau | Aug. 3, 1943 |
| 2,395,693 | Sorensen | Feb. 26, 1946 |
| 2,396,134 | Sorensen | Mar. 5, 1946 |
| 2,434,898 | Bascomb et al. | Jan. 27, 1948 |
| 2,457,149 | Herbst | Dec. 28, 1948 |
| 2,477,973 | Evers | Aug. 2, 1949 |
| 2,483,445 | Talley | Oct. 4, 1949 |
| 2,485,580 | Ferrar et al. | Oct. 25, 1949 |